(12) United States Patent
Pannozzo

(10) Patent No.: US 9,370,688 B1
(45) Date of Patent: Jun. 21, 2016

(54) MULTI-USE EXERCISE APPARATUS AND METHODS

(76) Inventor: Vincent P. Pannozzo, Fleming Island, FL (US)

( * ) Notice: Subject to any disclaimer, the term of this patent is extended or adjusted under 35 U.S.C. 154(b) by 567 days.

(21) Appl. No.: 13/465,472

(22) Filed: May 7, 2012

Related U.S. Application Data

(60) Provisional application No. 61/482,792, filed on May 5, 2011.

(51) Int. Cl.
*A63B 23/04* (2006.01)

(52) U.S. Cl.
CPC ..... *A63B 23/0405* (2013.01); *A63B 2023/0411* (2013.01)

(58) Field of Classification Search
CPC ........... A63B 21/1453; A63B 21/1457; A63B 21/1465; A63B 21/1469; A63B 21/1473; A63B 21/1476; A63B 23/04; A63B 23/0405; A63B 23/0411
USPC ........................................................ 482/132
See application file for complete search history.

(56) References Cited

U.S. PATENT DOCUMENTS

| | | | | |
|---|---|---|---|---|
| 126,796 | A | * | 5/1872 | Forward ........................... 482/97 |
| 3,465,750 | A | * | 9/1969 | Schawalder .................. 601/122 |
| 4,452,444 | A | * | 6/1984 | Schulze, Jr. ..................... 482/27 |
| 4,555,107 | A | * | 11/1985 | Otto ................................. 482/42 |
| 4,720,099 | A | * | 1/1988 | Carlson .......................... 482/133 |
| 5,050,868 | A | * | 9/1991 | Pearson .......................... 482/94 |
| 5,769,766 | A | * | 6/1998 | Huang ........................... 482/140 |
| 5,971,902 | A | * | 10/1999 | Robertson et al. ............. 482/142 |
| 6,022,298 | A | * | 2/2000 | Svedarsky ......... A63B 21/0615 482/130 |
| 7,520,846 | B1 | * | 4/2009 | Manuel .......................... 482/142 |
| 7,896,398 | B2 | * | 3/2011 | Suda et al. ......................... 285/7 |
| 2008/0076641 | A1 | * | 3/2008 | Sheehan ......................... 482/92 |

* cited by examiner

*Primary Examiner* — Loan H Thanh
*Assistant Examiner* — Rae Fischer
(74) *Attorney, Agent, or Firm* — Allen Dyer Doppelt Milbrath & Gilchrist

(57) ABSTRACT

Multi-use exercise apparatus has a platform base with four spaced legs having non-skid lower surfaces. An elongated box member supports padded rollers mounted on an axle disposed laterally of box member and a releasable lock attaches the box member to a base. A base complemental socket fittingly releasably receives a box end. The lock has one biased lug engageable with a socket shoulder when box end is in socket, and a release lever to disengage the lug to permit removal thereof. Box member extends from socket at an acute angle to dispose the rollers above the base so that user's knee may engage a roller during some exercises. Other similar rollers are above the base such that user feet may engage same during other exercises. Differing thickness pads are releasably connected to form differing heights thereof for providing a user knee block limiting the squatting during some exercises.

10 Claims, 7 Drawing Sheets

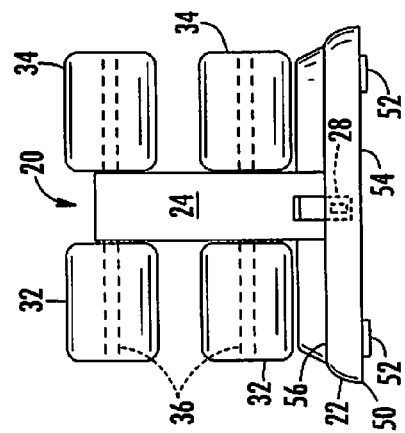
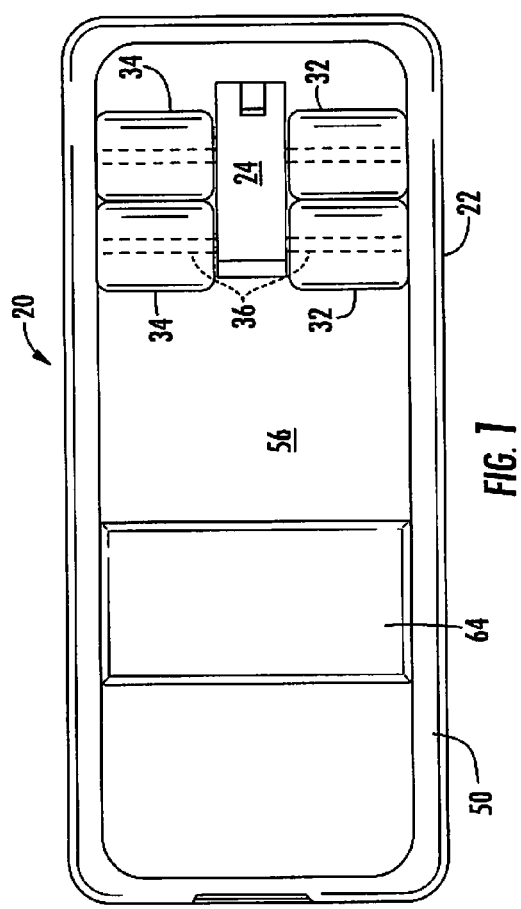
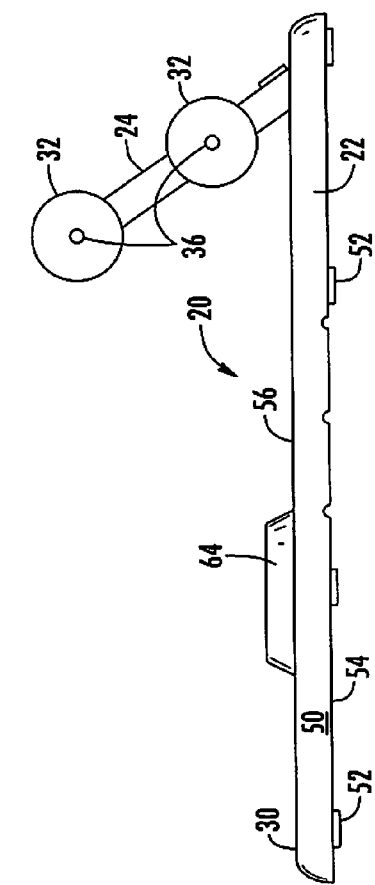

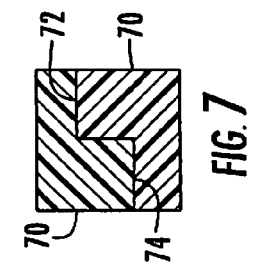
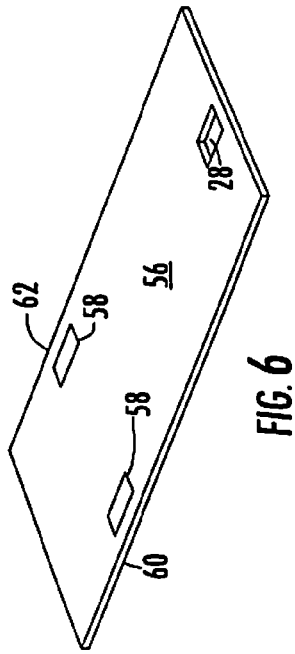
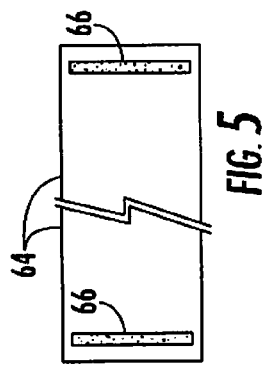
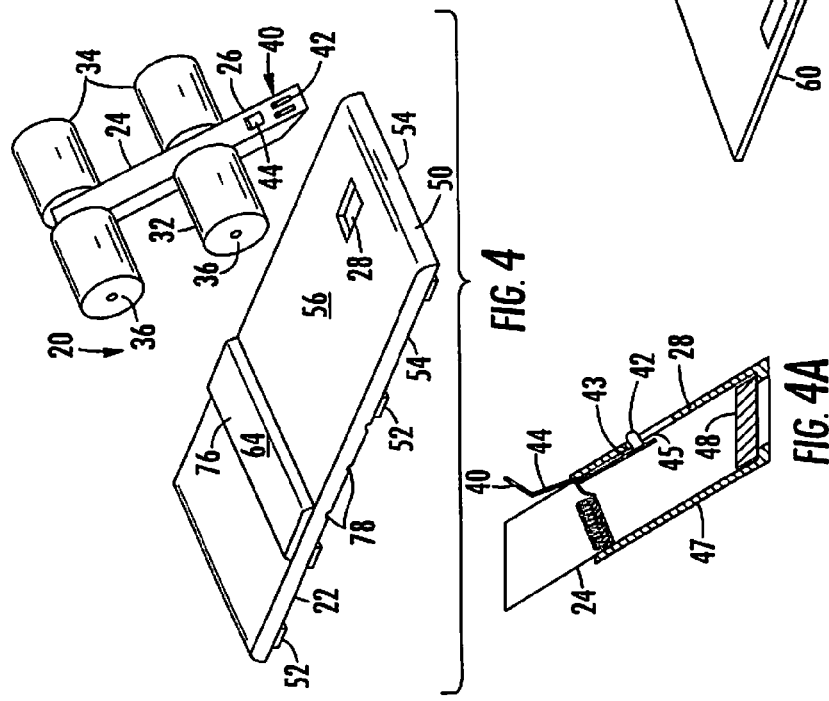

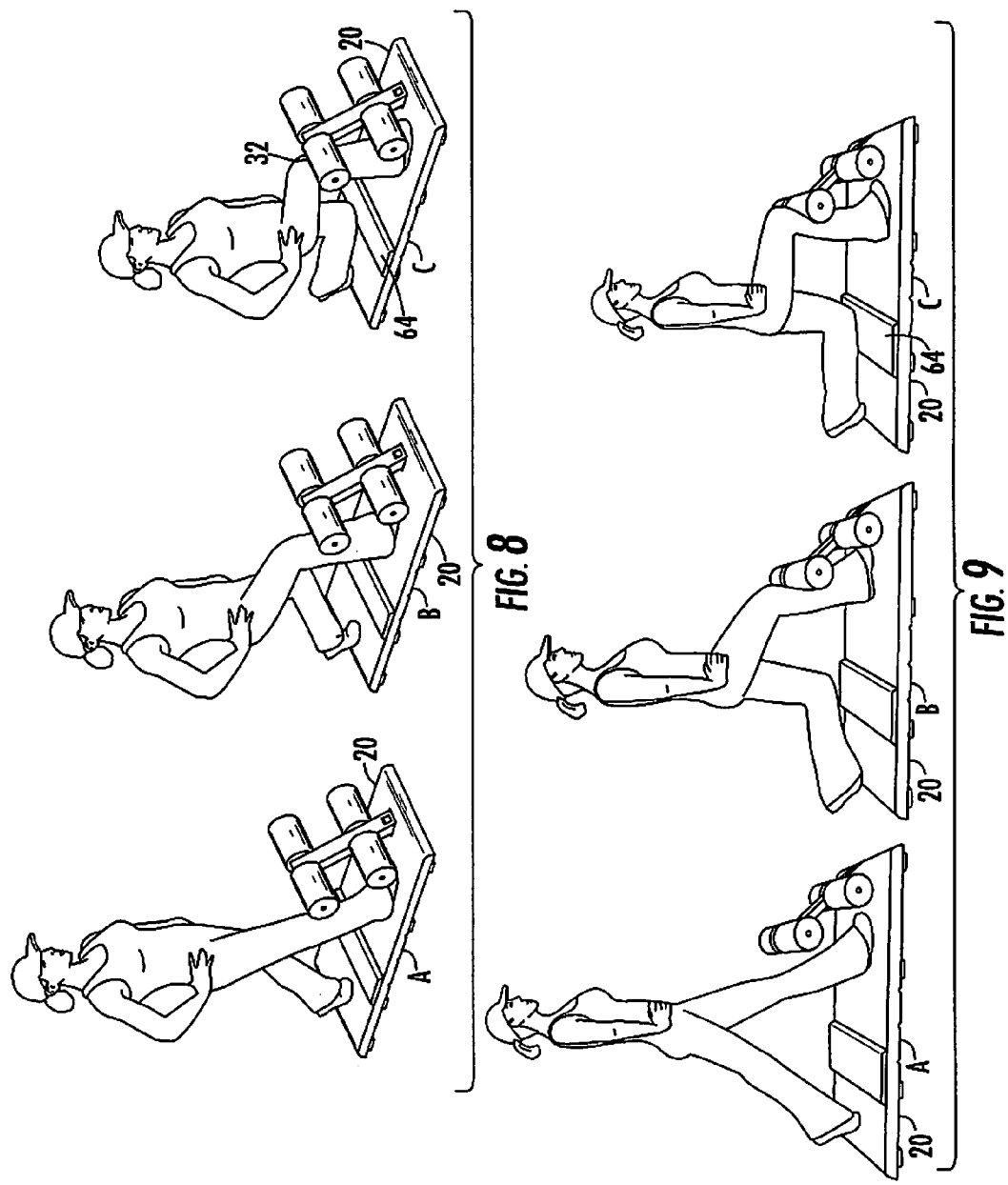

MULTI-USE EXERCISE APPARATUS AND METHODS

RELATED APPLICATION

This application claims the benefit of U.S. Provisional Patent Application Ser. No. 61/482,792 filed on May 5, 2011, the entire contents of which application is herein incorporated by reference in its entirety.

FIELD OF THE INVENTION

The present invention relates generally to the field of exercise and physical fitness for humans, and more particularly to apparatus and methods that minimize injury and make exercises more effective.

BACKGROUND OF THE INVENTION

There are many exercise devices, apparatus and methods usable in the home and at physical fitness centers, health clubs, gyms and the like. A sampling of the prior art can be found in the following U.S. Pat. Nos. 4,795,149; 5,050,868; 5,254,067; 5,445,583; 5,472,390; 5,474,509; 5,658,223; 5,897,459; 5,971,891; 6,022,298; and 6,926,643.

A multi-use exercise apparatus that is economical to manufacture, easily used in performing various exercises, readily assembled from a stored condition under a bed, for example, and readily disassembled for storage would fill a need sought by many humans who wish to exercise at home. The apparatus of this invention will fill such a need, and the apparatus is sufficiently robust as a commercial unit to be used in physical fitness centers, health clubs, gyms and the like.

SUMMARY OF THE INVENTION

According to an aspect of this invention, a multi-use exercise apparatus and a related method comprises a platform base having at least four spaced legs subtending therefrom, each leg having a non-skid lower surface, an elongated box member having opposite end portions, a pair of padded rollers mounted on an axle disposed laterally on opposing sides of the box member adjacent one of the end portions, the opposite end portion having a releasable lock for attachment of the box member to the base.

A socket complementary to the opposite end portion of the box member receives the opposite end portion and retains the opposite end portion therewithin, and the lock has at least one lug engageable with a shoulder of the socket when the opposite end portion is disposed within the socket, with a release lever to disengage the lug from the shoulder to permit removal of the opposite end portion from the socket.

Other aspects are provided by the box member extending from the socket in an acute angle to dispose the pair of rollers above the base so that a knee of a user may engage one of the rollers during some exercises. Another pair of rollers are mounted on another axle disposed adjacently above the opposite end portion such that the feet of the user may engage the other pair of rollers during some exercises. A thick pad is releasably attached to an upper surface of the base and located spacedly rearwardly from the pair of rollers. A plurality of differing thickness pads are releasably connected to form differing heights thereof for providing a knee block for a user to limit the squatting depth of the user during some exercises. The pair of rollers are parallel to the other pair of rollers.

The lug of the lock is biased into locking engagement with the shoulder of the socket. A plurality of spaced attachment locations are disposed along both sides of the base for receiving releasable hand held tension devices for performance of some exercises by a user. Fluff and hook releasable connectors are attached between the pad and the upper surface of the base. Also, fluff and hook releasable connectors are provided between the plurality of pads to vary the height of the knee block, formed by such pads.

The apparatus permits exercises that are effective and that reduce the potential for injuries.

BRIEF DESCRIPTION OF THE DRAWINGS

The novel features believed to be characteristic of this invention are set forth with particularity in the appended claims. The invention itself, however, both as to its organization and to its method of operation, together with further objects and advantages thereof, may best be understood by reference to the following description taken in connection with the accompanying drawings, in which:

FIG. 1 is a top plan view of the exercise apparatus according to the invention;

FIG. 2 is a left side elevational view thereof;

FIG. 3 is a front elevational view thereof;

FIG. 4 is a top front, left side perspective view thereof partially disassembled for storage;

FIG. 5 is a bottom plan view of one embodiment of a pad releasably attached to the upper portion of the apparatus;

FIG. 6 is a partial perspective view of the upper portion of the apparatus without the pad thereon;

FIG. 7 is a cross sectional view of an alternate pair of pads to be releasably attached to the upper portion of the apparatus;

FIG. 8 is a multiple perspective illustration of a human performing a lunge exercise on the exercise apparatus according to the invention;

FIG. 9 is a multiple side elevational illustration of FIG. 8;

FIG. 15 is a multiple side elevational illustration of a human performing an abdominal exercise with a weighted ball or the like.

DETAILED DESCRIPTION OF THE PREFERRED EMBODIMENT

Figure 10:
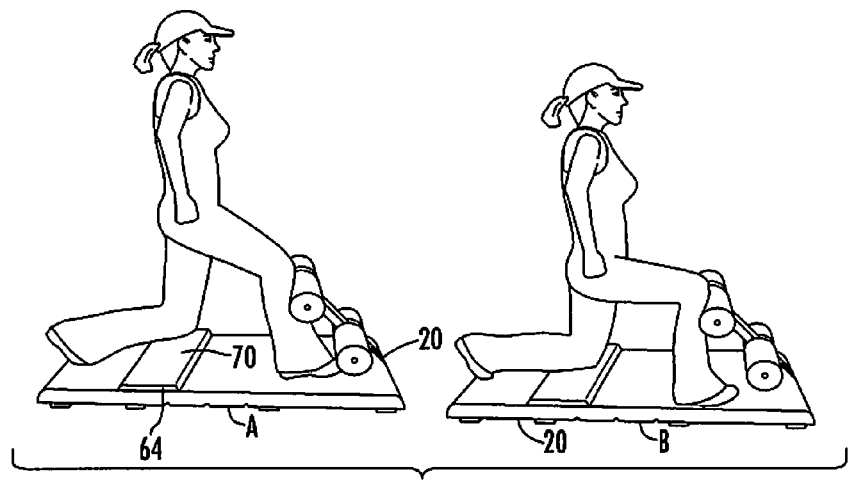
FIG. 10 is a multiple side elevational illustration of a beginner human and an intermediate human performing a blocked lunge.

Referring now to the drawings of FIGS. 1-4, the multi-use exercise apparatus according to this invention is depicted and identified generally by numeral 20 and comprises a rectangular platform base 22 with a releasably attachable elongated box member 24 having a lower end portion 26 telescopingly disposable in a complementary socket 28 attached to the base 22, as will be more fully described below.

As shown, the elongated box member 24 is slanted at an acute angle toward the rear 30 of the base to dispose the pairs of padded roller 32, 34 entirely in overlying spaced positions above base 22. The padded rollers 32, 34 are freely rotatable on their respective axles 36 so that when the rollers 32, 34 are engaged by parts of the body of a human while exercising, there is a minimum of friction and/or scraping therebetween.

A suitable releasable lock 40 is provided including a pair of spaced lugs 42, extending above the upper surface of the elongated box member 24, which are connected to a spring biased release lever 44 such that pulling the lever 44 away from the elongated box member 24 causes the lugs 42 to temporarily retract below the surface of member 24 and disengage from a shoulder (not shown) or shoulders of socket 28 so that the elongated box member 24 may be pulled out of the socket 28. Any other suitable accessible lock may be provided, as for example, a spring biased push button releasable lock or the like. Socket 28 may include a complementary box member affixed to base 22 to telescopingly receive the elongated box member 24, and if more rigidity is desired, a plug may be internally secured to the complementary box member affixed to base 22 to telescope partially within the elongated box member 24.

Referring to FIGS. 4-6, the base 22 includes a sturdy platform 50 having non-skid spaced legs 52 subtending below lower surface 54 of platform 50. The upper surface 56 includes a pair of spaced releasable hook type strips 58 adjacent the side edges 60, 62 and extending therealong to adjustably position elongated pad 64 in various locations for different size humans and/or dependent on the exercise being performed on the platform 50. Accordingly, pad 64 releasably engages with strips 58 on the platform 50. The base 22 may be fabricated of any suitable material such as aluminum or impact-resistant high density polyethylene. Also, the upper surface of base 22 may be covered by a suitable strong material, if desired.

FIG. 7 depicts a pair of pads 70 which has similar strips of hook-type strips (not shown) to strips 58 along the bottom and top of the pads 70, as depicted. Fluff type strips (not shown) like strips 66, may be provided along each of edge portions 72 and 74, so that various heights of pad 64 and the pair of pads 70 may be achieved. For example, if the height of the two pads 70, as shown, is 6" with the smaller being 2" and the larger being 4", one of the two pads 70 could replace pad 64 and provide a 4" knee block, and if both were used stacked so one 4" portion extends above the other 4" portion, an 8" knee block is provided. The pad 64 could be useable with pads 70 if one desired to do so by providing releasable fluff type spaced strips along the upper surface 76 of pad 64 which would mate with hook type strips on one pad 70. Thus, it is possible to have a knee block, for example, at 4", 6", 8", or 10" above the upper surface 56 of platform 50. The primary function of the knee block is to limit the range or depth of the trailing knee during the lunge exercise. This is especially important for users with compromised knee function and or beginners.

The pad 64 and pads 70 preferably are all formed of dense foam rubber or foam plastic material which are suitably encased in a fabric covering. The padded rollers 32, 34 may be similarly formed or the foam material may be of a different density.

Figure 11:
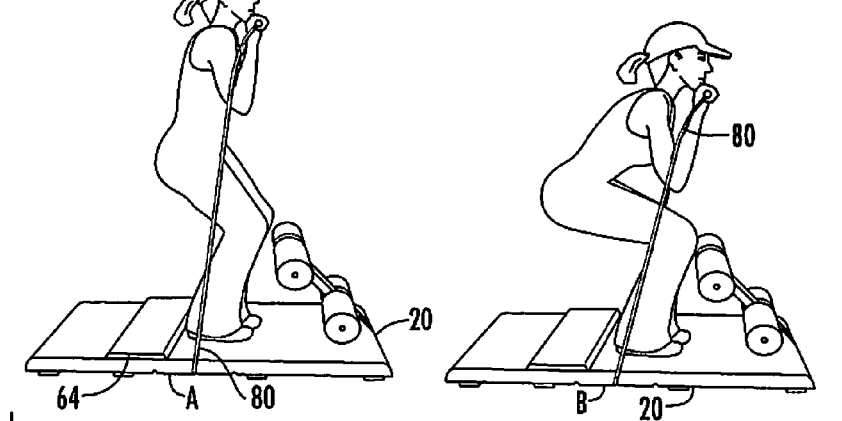
FIG. 11 is a multiple side elevational illustration of a human performing a squatting exercise with hand held devices.
Figure 14:
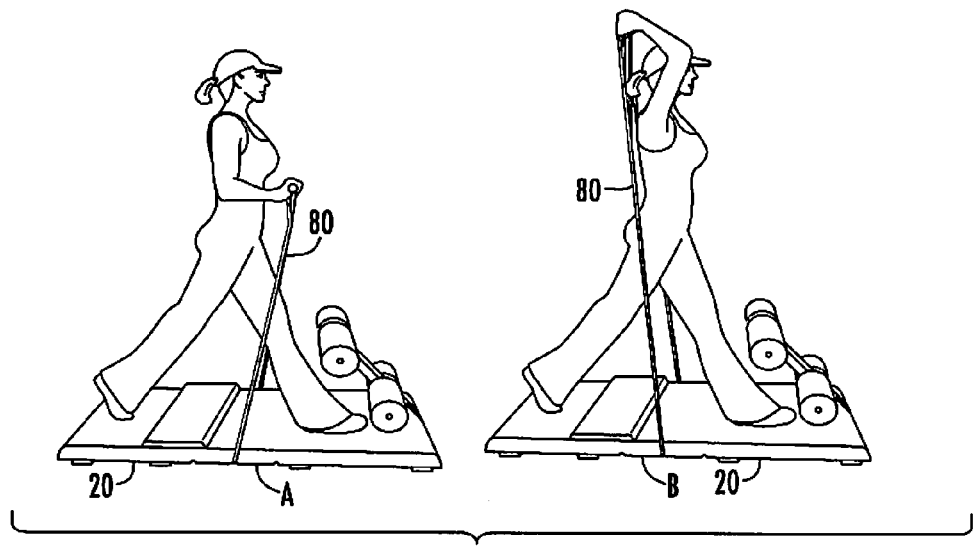
FIG. 14 is a multiple side elevational illustration of a human performing a bicep curl exercise and an overhead tricep extension with hand held tension devices.
Figure 16:
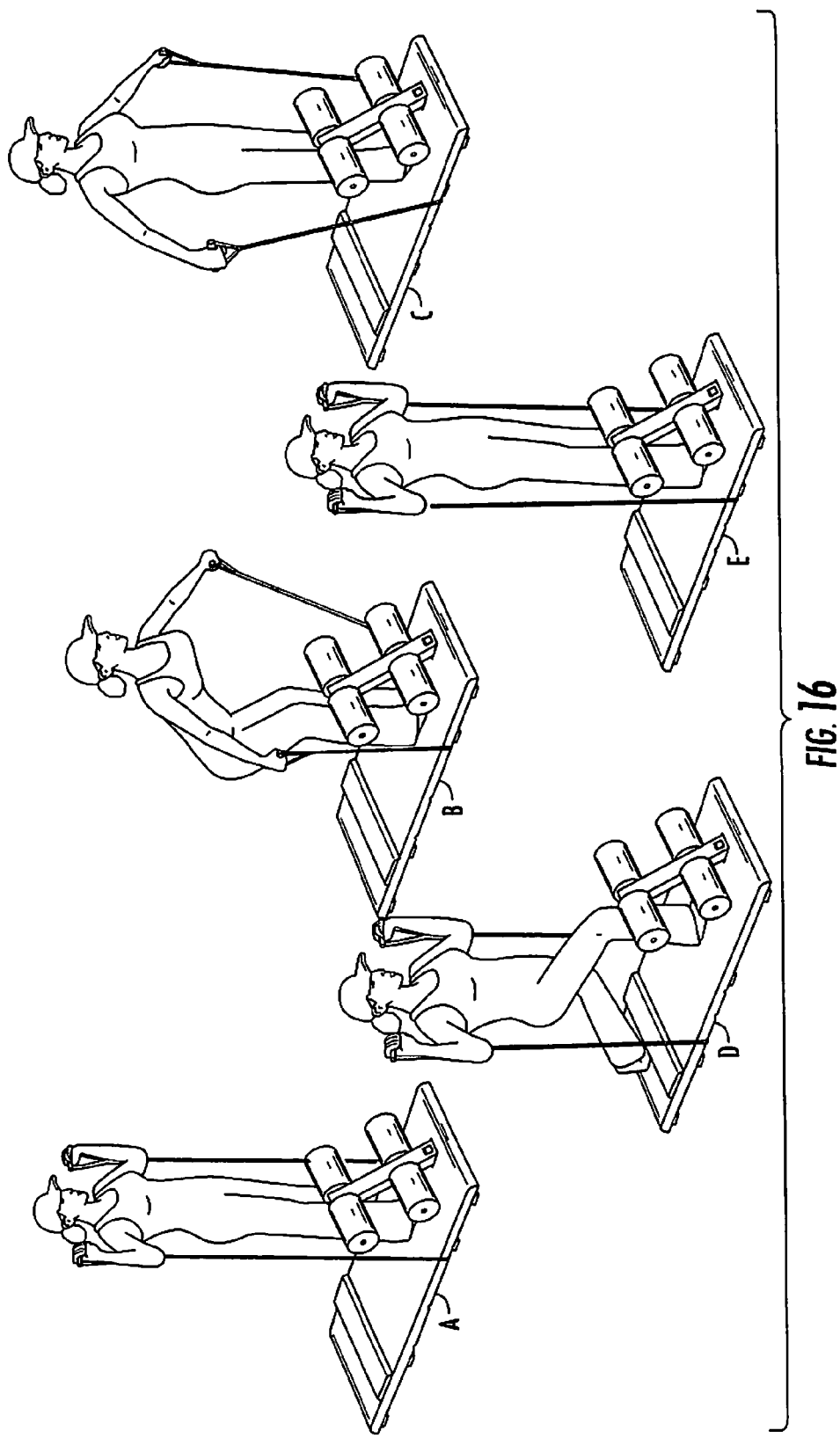
FIG. 16 is a multiple perspective illustration depicting various exercises with hand held tension devices, namely starting at upper left, the over press exercise; the rear delt exercise, the lateral raise exercise; the power lunge exercise, and the standing calf raise (being shown in the starting position).

The platform 50 includes a plurality of spaced notches 78 to accommodate hand held tension devices 80, illustrated in FIGS. 11, 14 and 16. The hand held tension devices 80 may be of the type known as standard Versa-Tube resistance tubing which can be of, for example, three different resistance levels—light (green); medium (red) and heavy (blue). The notches 78 can be replaced by eyes or rings onto which the tension devices 80 may be easily snapped and readily released, as commonly used in the exercise field.

Referring now to FIGS. 8 and 9 which the three positions of a lunge exercise is performed. It begins with hands on the hips with one leg and foot forward, as shown at A, and the human squats downwardly, as shown at B, and finishes with the forward knee engaging the upper roller 32, as shown in C. The knee of the trailing leg mayor may not be engaged on pad 64 depending on the individual performing the exercise and one's athleticism. The multiuse exercise apparatus 20 positions the forward knee over the ankle while keeping the lower leg at 90 degrees as illustrated in FIG. 9C, which isolates key muscle groups for optimal exercise results without causing injury to the knee joint.

FIG. 10 illustrates the block lunge exercise for the beginner or knee compromised user in FIG. A with the trailing knee engaging a raised pad 70 above pad 54, providing a 6" high block for the knee so that the beginner will not perform a full lunge.

FIG. 10B illustrates a 4" high block for permitting a less than complete lunge by an intermediate user.

For a squatting exercise with hand held tension devices 80, the user stands on the platform 64, as shown in FIG. 11, rearwardly of the rollers 34 and 36 and moves between positions A and B. Normally, the knees do not engage the rollers 32 and 34, but may do so.

Figure 12:
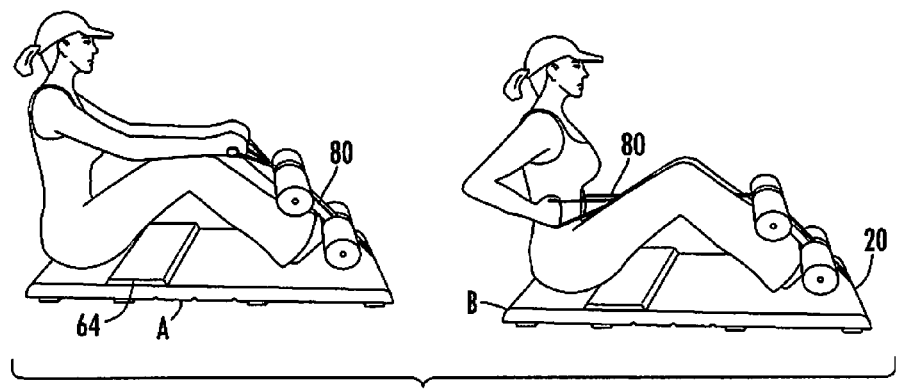
FIG. 12 is a multiple side elevational illustration of a human performing a seated rowing exercise with hand held tension devices.

A seated rowing exercise is illustrated in FIG. 12 with the tension devices 80 connected to the elongated box member 24 or looped therearound. The user sits behind pad 64 with the user's feet engaged with the lower rollers 32, 34 and moves the user's arms between the positions illustrated by A and B of FIG. 12.

Figure 13:
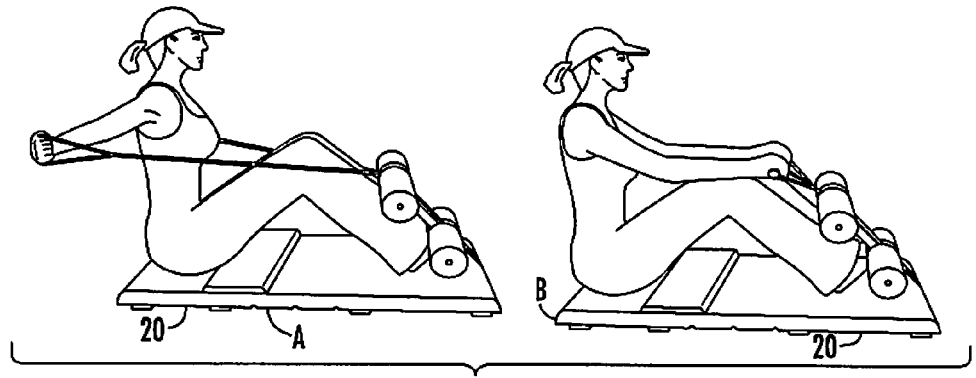
FIG. 13 is a multiple side elevational illustration of a human performing a seated rear delt exercise with hand held tension devices.

A seated rear delt exercise is illustrated in FIG. 13 with the tension devices 80 similarly connected and the user moves the arms between the positions illustrated by A and B to perform this exercise.

A bicep curl exercise is depicted in FIG. 14A and an overhead tricep extension is shown in FIG. 14B with the tension devices 80 to be curled at the wrists in A and stretched up and down by the user in B.

Figure 15:
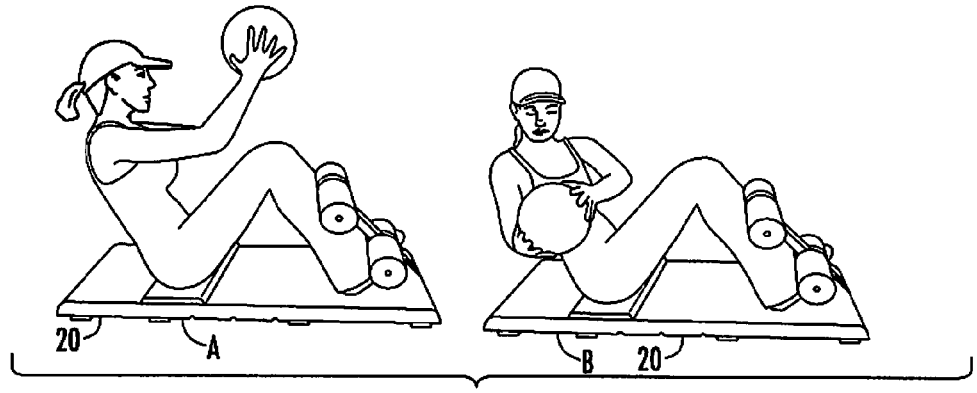

FIG. 15 shows the start position in A and the side move to the right side of the user in B. The exercise then proceeds back to A and the user moves to the right side which is the mirror image of B. A weighted ball, i.e., a medicine ball is held by the user in performing this exercise on the multi-use exercise apparatus 20 of this invention. One should note the feet of the user engage beneath lower padded rollers 32, 34 during this exercise, which effectively exercises the abdominal area of the user.

FIG. 16 has A, B, C, D and E illustrations respectively depicting the user performing an over press, a rear delt, a lateral raise, a power lunge and a standing calf raise, all exercises being commonly known to those skilled in the exercise field.

Figure 17:
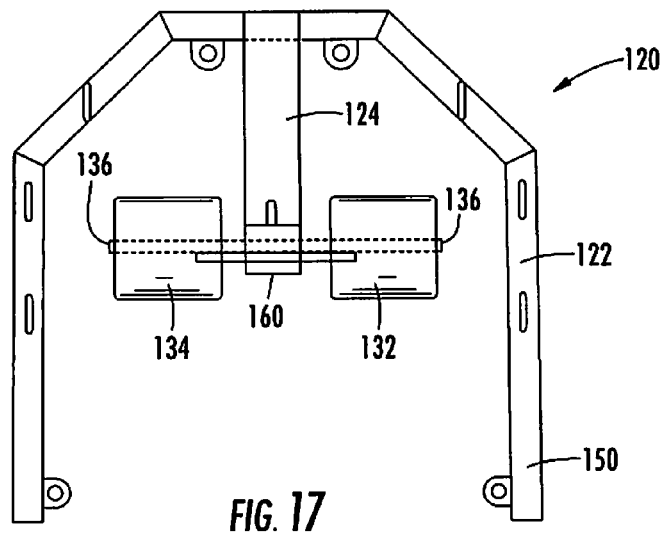
FIG. 17 is a top plan view of another embodiment of exercise apparatus according to this invention.
Figure 18:
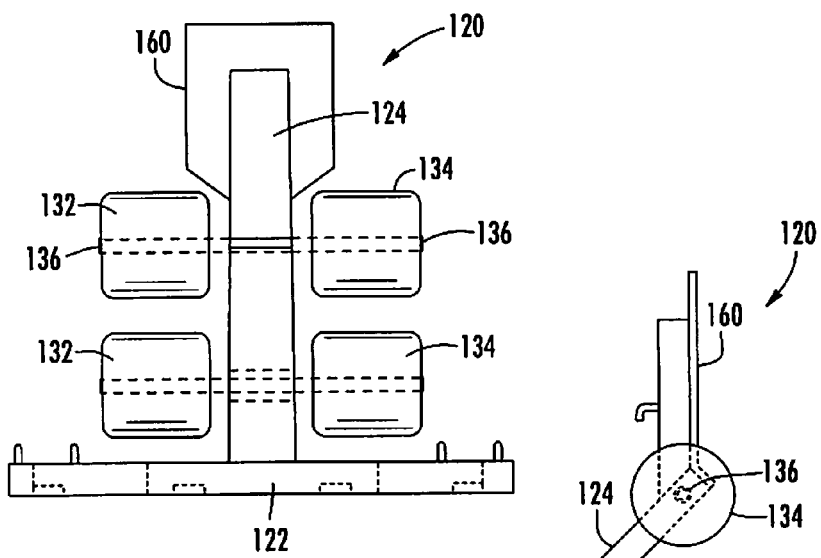
FIG. 18 is a front view of the embodiment shown in FIG. 17.
Figure 19:
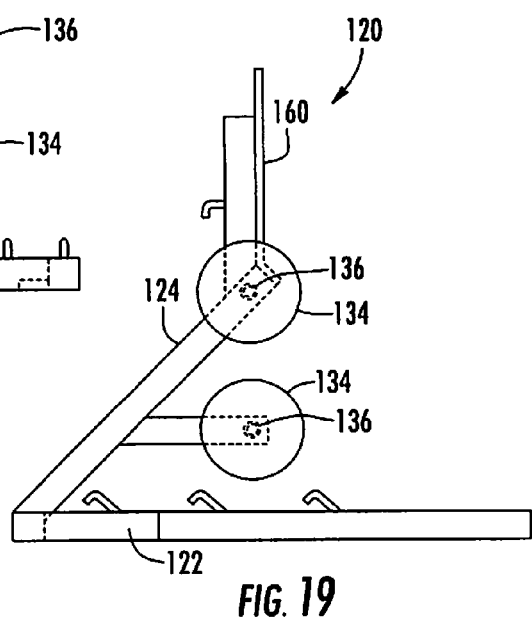
FIG. 19 is a side view of the embodiment shown in FIGS. 17 and 18.

FIGS. 17, 18 and 19 are top plan, front and side views, respectively, of another embodiment of the exercise apparatus of this invention where like reference numerals preceded by the numeral "1" indicate the same element of FIGS. 1-16. In the embodiment of FIGS. 17-19, a vertically-extending plate 160 is provided to assist in conducting the crunch exercise.

It is to be understood that other exercises can be performed on the multi-use exercise apparatus, like the stepping exercise, sit-ups, and the like, without departing from the scope of this invention.

In general, the foregoing description of preferred embodiments is provided for exemplary and illustrative purposes; the present invention is not necessarily limited thereto. Rather, those skilled in the art will appreciate that additional modifications, as well as adaptations for particular circumstances, will fall within the scope of the invention as herein shown and described.

What is claimed is:

1. A multi-use exercise apparatus, comprising:
   a platform base extending between front and rear platform ends and having opposed upper and lower platform surfaces, the platform base being dimensioned to accommodate a standing user during a lunge exercise;
   a plurality of legs underlying the lower platform surface;
   a socket extending into the upper surface of the platform base proximate the front platform end;
   an elongated box member extending between first and second box member end portions, the first box member end portion being received in the socket;
   a first axle connected to the second box member end portion with first and second axle end portions extending past opposite sides of the elongated box member, the first axle being generally parallel with the upper platform surface; and
   a first pair of padded rollers mounted on the first axle first and second axle end portions, respectively;
   wherein the first pair of padded rollers is positioned such that, during the lunge exercise, the user's forward knee is engageable with one of the first pair of padded rollers with the user's forward knee over the user's forward ankle and the user's forward lower leg at 90 degrees to the platform base.

2. The apparatus of claim 1 wherein the elongated box member extends rearwardly from said socket at an acute angle relative to the upper platform surface to dispose the pair of rollers above the upper platform surface in a position to engage the a knee of the user during the lunge exercise.

3. The apparatus of claim 2 further comprising a pad releasably attached to the upper platform surface and located closer to the rear platform end than the first pair of rollers.

4. The apparatus of claim 3 further comprising hook and loop releasable connectors attached between said pad and the upper platform surface.

5. The apparatus of claim 1 further comprising:
   a second axle connected to the elongated box member below the first axle, the second axle also having first and second axle end portions extending past opposite sides of the elongated box member, the second axle also being generally parallel with the upper platform surface; and
   a second pair of padded rollers mounted on the second axle first and second axle end portions, respectively.

6. The apparatus of claim 1 further comprising a plurality of spaced attachment locations along both sides of said platform base for receiving releasable hand held tension devices for performance of some additional exercises by the user.

7. The apparatus of claim 1, further comprising a lock releasably securing the first box member end portion in the socket.

8. The apparatus of claim 7, wherein the lock includes at least one lug engageable with a shoulder of the socket when the first box member end portion is disposed within the socket and a release lever to disengage the lug from the shoulder to permit removal of the first box member end portion from the socket.

9. A method of performing a lunge exercise:
   standing with a first foot on the upper surface of a platform proximate to a rear end thereof, and a second foot on the upper surface of the platform forward of the first foot and proximate to a roller located above upper surface of the platform; and
   bending first and second knees, corresponding to the first and second feet, respectively, to bring the first knee proximate to the upper surface of the platform and the second knee into contact with the roller, such that the second knee is over a second ankle corresponding to the second knee, and a second lower leg corresponding to the second knee is at 90 degrees to the platform.

10. The method of claim 9, wherein bringing the first knee proximate to upper surface of the platform includes touching the first knee to a pad connected to the upper surface of the platform.

\* \* \* \* \*